United States Patent [19]

Naaktgeboren

[11] Patent Number: 4,911,491

[45] Date of Patent: Mar. 27, 1990

[54] MODULAR BALE HANDLING APPARATUS WITH PLURALITY OF BALE PICK-UP DEVICES

[75] Inventor: Adrianus Naaktgeboren, Zedelgem, Belgium

[73] Assignee: Ford New Holland, Inc., New Holland, Pa.

[21] Appl. No.: 275,233

[22] Filed: Nov. 22, 1988

[30] Foreign Application Priority Data

Nov. 27, 1987 [EP] European Pat. Off. ........ 87202348.6
Nov. 27, 1987 [EP] European Pat. Off. ........ 87202346.0

[51] Int. Cl.[4] .......................... A01D 87/12; B66C 3/04
[52] U.S. Cl. ..................................... 294/105; 294/61; 294/87.1; 294/109; 414/111; 414/736; 414/740
[58] Field of Search ...................... 294/61, 81.2, 81.61, 294/87.1, 88, 105, 107–109, 110.1, 120; 414/24.5, 111, 721, 736, 740

[56] References Cited

U.S. PATENT DOCUMENTS

| | | |
|---|---|---|
| 2,734,646 | 2/1953 | Stimpson . |
| 3,112,136 | 3/1959 | Hammond . |
| 3,420,564 | 8/1966 | Jensen et al. . |
| 4,193,728 | 3/1980 | Steketee . |
| 4,548,535 | 12/1983 | Van Die . |
| 4,673,645 | 1/1987 | Eriksson ............... 294/110.1 |

FOREIGN PATENT DOCUMENTS

| | | |
|---|---|---|
| 1020450 | 10/1963 | United Kingdom . |
| 1267665 | 10/1968 | United Kingdom . |
| 1554183 | 7/1975 | United Kingdom . |
| 1603621 | 5/1978 | United Kingdom . |
| 2011346 | 12/1978 | United Kingdom . |
| 2024771 | 7/1979 | United Kingdom . |

Primary Examiner—Johnny D. Cherry
Attorney, Agent, or Firm—Darrell F. Marquette; Frank A. Seemar; Larry W. Miller

[57] ABSTRACT

Bale handling apparatus comprises a main frame including transverse supports and devices mounted on the main frame for picking up bales. These bale pick-up devices comprise a plurality of substantially identical modules which are transversely adjustably mounted on the transverse supports of the main frame so that the number and position of the modules can be varied. The bale pick-up devices each have movable tines which, in an operative position, engage a bale and, in an inoperative position, are retracted clear of a bale, and actuators associated with each respective bale pick-up device operable to move the movable tines thereof to and from the operative position. The actuators of the respective bale pick-up devices are connectable in parallel to a common drive and releasable locking devices are associated with the movable tines of each bale pick-up device for locking the movable tines in the inoperative position. The movable tines which are unlocked against movement to the operative position and have not already achieved the latter position, will be moved to the operative position when the common drive is operated to energize the actuators in the sense for moving the movable tines to the operative position.

26 Claims, 2 Drawing Sheets

MODULAR BALE HANDLING APPARATUS WITH PLURALITY OF BALE PICK-UP DEVICES

BACKGROUND OF THE INVENTION

This invention relates to bale handling apparatus and more particularly, to such apparatus for handling bales of crop material of the rectangular type.

It is common practice for crop material such as straw or hay, to be formed into rectangular bales by a baling machine. Such a baling machine drops completed bales one after another on the ground, unless it is fitted with bale handling equipment, and thus it is necessary to subsequently pick up these individual bales scattered randomly over a field and load them on to a bale wagon, or other vehicle, for transport to a required location.

For many decades relatively small rectangular bales produced by conventional small rectangular balers were popular. Such bales were handled either manually or mechanically. Different types of bale handling equipment have been in use for many years to handle such bales mechanically. However, during recent years new balers producing much larger rectangular bales appeared on the market. Bales produced with such machines can be handled only mechanically. However, the various so-called "medium size" and "large rectangular balers" presently already on the market produce bales of widely different dimensions. As an example, one such baler, which commonly is indicated as a "medium size rectangular baler", produces bales measuring approximately 60 cm by 90 cm and having a length of 1.2 m up to 2.5 m. Another baler, equally identified as a medium size rectangular baler produces bales measuring approximately 90 cm by 90 cm and equally having a length which can vary quite substantially.

Accordingly, there is a need for bale handling equipment which is capable of picking up such individual bales scattered randomly over a field and of organizing them into regular packs for loading onto bale wagon, or other vehicle, for transport to a required location.

One example of known bale handling equipment of the type with which the present invention is concerned, is disclosed in U.S. Pat. No. 4,548,538. This equipment comprises three carrier frames on which are mounted respective sets of claws for picking up bales. These claws are designed to pick up three bales disposed in side-by-side relationship. In order to minimize the overall width of such a pack of three bales when picked up by the equipment, primarily to meet official requirements regarding widths of loads, it is necessary to provide relatively elaborate arrangements to effect relative lateral displacement between the three sets of claws. Accordingly, this prior equipment is expensive and furthermore also suffers from the disadvantage that each set of claws has associated with it individually operated hydraulic actuating means for moving the claws of the set into and out of engagement with a bale, and this also increases the complexity and cost of the equipment.

It therefore is an object of the present invention to provide bale handling equipment of the type referred to hereabove which is simple in design and yet versatile in use.

SUMMARY OF THE INVENTION

According to one aspect of the invention, bale handling apparatus is provided which comprises a main frame including transverse support means, and means mounted on the main frame for picking up bales, including a plurality of substantially identical modules which are transversely adjustably mounted on the transverse support means of the main frame, so that the number and position of the modules can be varied.

Each module preferably comprises fixed and movable tine means for engaging a bale, and a main beam which, when the module is attached to the main frame, extends generally perpendicularly to the transverse support means of said main frame. The transverse support means of the main frame may comprise a first transverse beam and a second transverse beam spaced below the first beam. Each module may be provided with a mounting means which is releasably attachable to the first beam and which further is cooperable with the second beam to support the module in position.

The mounting means for each module may be in the form of generally upright cranked means which is fixedly coupled at or adjacent the upper end thereof to the rear end of the main beam of the module an which has a lower end, when the module is mounted on the main frame, in abutting engagement with the second transverse beam of the main frame. The cranked means also may carry at or adjacent the lower end the fixed tine means.

Each bale pick-up module may be releasably attachable to the first transverse beam of the main frame by a pair of spaced apart mounting members provided on he module and engageable with opposed surface areas of the first transverse beam; the mounting members being clampable together so as releasably to secure the module in a selected position on the first transverse beam.

The movable tine means of each pick-up module preferably are provided at the forward end of the main beam of the module for pivotal movement between an operative position in which the tine means engage a bale to assist in supporting the same and an inoperative position in which the tine means are retraced clear of a bale.

Each bale pick-up module may be telescopingly adjustable to enable the length thereof to be adjusted to suit the length of the bales to be handled.

According to another aspect of the invention, bale handling apparatus is provided which comprises a generally transversely extending main frame, a plurality of independent bale pick-up devices mounted on the main frame and each device having movable tine means which, in an operative position, engage a bale and, in an inoperative position, are retracted clear of a bale, and actuator means associated with each respective bale pick-up device and operable to move the movable tine means thereof to and from the operative position. The actuator means of the respective bale pick-up devices are connectable in parallel to common drive means, and releasable locking means are associated with the movable tine means of each bale pick-up device for locking the movable tine means in the inoperative position so that only those movable tine means which are unlocked against movement to the operative position and have not already achieved the latter position, will be moved to the operative position when the common drive means is operated to energize the actuator means in the sense for moving the movable tine means to the operative position.

Each bale pick-up device preferably comprises main beam extending generally perpendicularly to the generally transverse main frame and which operatively supports the corresponding movable tine means generally at or adjacent its forward end. The actuator means and common drive means preferably are of the hydraulic type.

Each bale pick-up device is provided with bale sensing means associated with the locking means of each pick-up device in a manner such that the locking means are moved to the unlocking position when the bale sensing means sense a bale which is properly positioned relative to said bale pick-up device and is ready for being picked up thereby. The bale sensing means of each bale pick-up device comprise a bell-crank lever which is operably connected to the corresponding locking means of said pick-up device and which includes an arm which, in use, is engaged and moved by a bale positioned as indicated herebefore.

The releasable locking means of each bale pick-up device preferably comprises a linkage system coupled to the movable tine means of said pick-up device for movement in unison therewith, and a locking member releasably co-operable with said linkage system to allow or prevent, as appropriate, movement of that system and, as a consequence, also of the movable tine means to which the system is coupled.

The linkage system of each pick-up device preferably comprises a rod operatively associated at one end with the corresponding movable tine means and pivotally connected at the other end to one end of a link, the other end of which is pivotally mounted on the main beam of the bale pick-up device; the rod and the link providing an extensible member which is held in a retracted position by the corresponding locking member when the latter is in the locking position to prevent movement of said movable tine means to the operative position from the inoperative position and which is permitted to move to the extended position by the movement of the movable tine means from the inoperative position to the operative position when the locking member is in the unlocking position.

The locking member of each bale pick-up device preferably is provided with a hooked end which is co-operable with the corresponding linkage system to effect a locking of the corresponding movable tine means in the inoperative position and which forms part of a bell-crank lever which is pivotally mounted on the main beam of said pick-up device and which is operatively coupled to the corresponding bale sensing means for being moved thereby to the unlocking position when the bale sensing means senses a bale; the releasable locking means further also comprising resilient means acting between the main beam and the locking bell-crank lever to urge the hooked end of the locking member thereof to the locking position.

DESCRIPTION OF THE DRAWINGS

A bale handling apparatus in accordance with the present invention will now be described in greater detail, by way of example, with reference to the accompanying drawings, in which:

FIG. 3 is a hydraulic circuit employed in the apparatus of FIGS. 1 and 2.

DESCRIPTION OF THE PREFERRED EMBODIMENT

The terms "forward", "rearward", "left" and "right" used throughout the specification are determined with reference to the direction of forward operative travel of the baling machine and are not to be considered as limiting. Also, the terms "upper" and "lower" are used throughout the specification principally for convenience and it should be understood that these terms equally are not to be construed as limiting.

Figure 1:
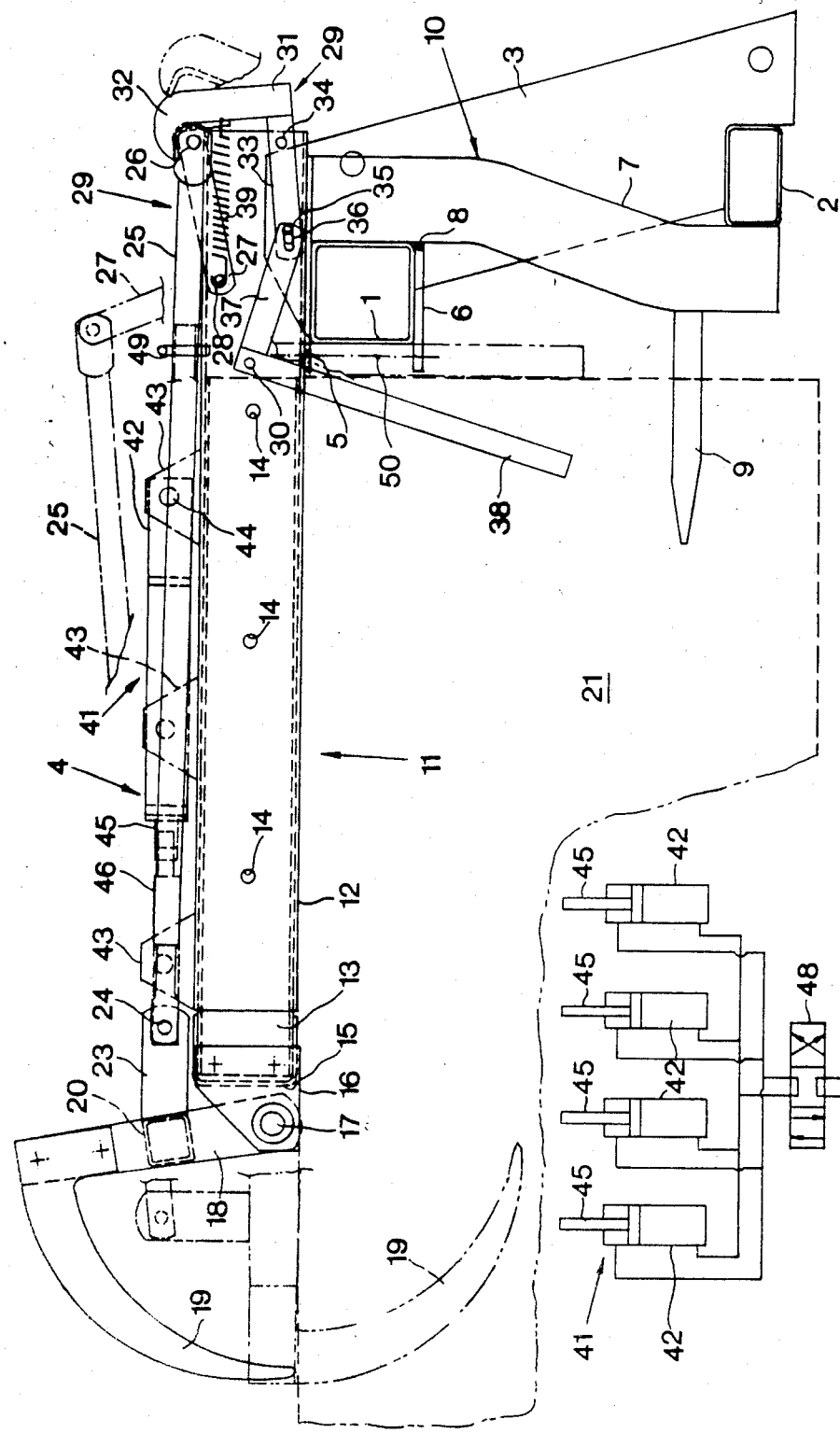
FIG. 1 is a side view of the apparatus.
Figure 2:
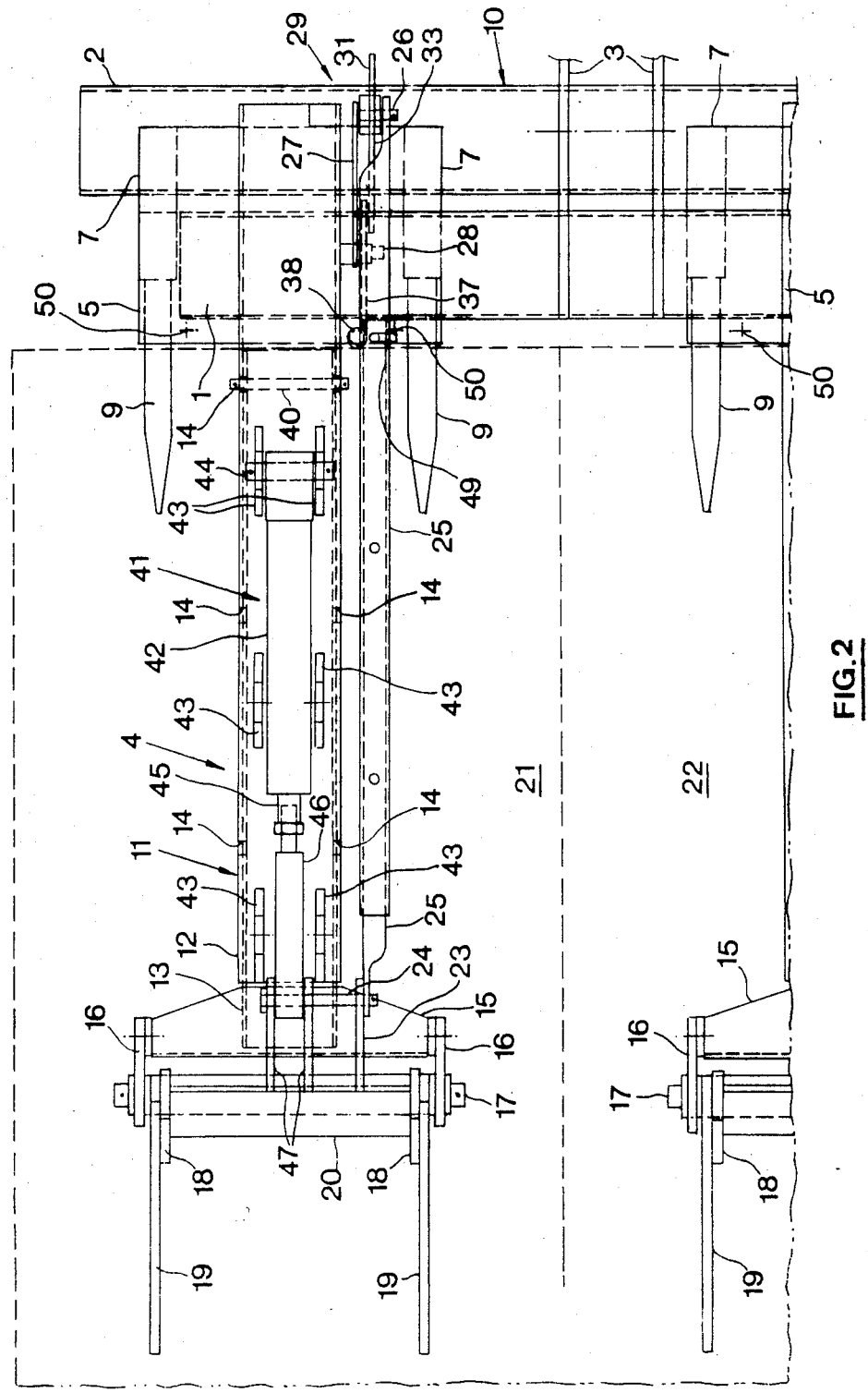
FIG. 2 is a partial plan view of the apparatus shown in FIG. 1.

Referring first to FIGS. 1 and 2 of the drawings, the bale handling apparatus comprises a base or main frame 10 comprising a main and transverse carrier beam 1 of rectangular cross-section, and a secondary transverse beam 2 also of rectangular cross-section. The beams 1 and 2 are connected by two pairs of generally vertical plates 3. Each pair of plates 3 is spaced apart by a distance sufficient to receive therebetween respective arms of a front end loader attachment for a tractor, or other vehicle; neither the tractor nor the front end loader attachment being shown in FIGS. 1 and 2. On this simple base frame 10 there are provided a plurality of identical bale pick-up devices in the form of bale grab modules 4. Each module is slidably mounted on the main carrier beam 1 by way of two opposed mounting plates 5 and 6; the plate 5 being attached to the upper end of a corresponding pair of cranked members 7, and the plate 6 being hingedly connected to these cranked members 7 at 8. The outer ends of the plates 5 and 6 extend beyond the corresponding face of the beam 1 and are apertured to receive bolts (only schematically shown at 50) which are used to clamp a module 4 in any selected position on the beam 1. The plate 6 is hinged to the cranked members 7 in order to facilitate assembly and removal of the module 4 on the main beam 1. The lower end of each cranked member 7 bears against the forward face of the secondary beam 2 and carries a fixed bale-engageable tine or spike 9, each module 4 thus having a pair of spaced-apart tines or spikes 9.

In the illustrated embodiment, four bale grab modules 4 are provided, spaced along the main transverse beam 1 and with the middle two modules 4 being mounted between the pairs of connecting plates 3. These middle two modules 4 are not normally removed from the apparatus once assembled, but they are capable of being slid along the beam 1 to selected relative positions thereon. The outer two modules 4 may be removed from the apparatus, when only two modules are required. It will be appreciated at this stage that the bale handling apparatus can be provided with more than four bale grab modules 4, it merely being necessary to provide an appropriate length of main beam 1 and secondary beam 2 consistent with providing the necessary structural strength to these beams 1, 2 in order to accommodate the weight of the fully loaded apparatus. To this end, the beams 1 and 2 may be made telescopic.

Each bale grab module 4 further comprises telescopic main beam 11 extending forwardly from the top mounting plate 5 and comprising outer and inner members 12 and 13, respectively, of rectangular cross-section. The adjustability of the length of the beam 11 of each bale grab module 4 is provided so that the apparatus can be adjusted to accommodate bales of any length between the standard lengths of 1.2 m to 2.5 m. The outer and inner members 2, 13 of each beam 11 are provided with a series of apertures 14 which can be aligned and a pin, bolt or other device 40 inserted therein so as to secure the beam in an adjusted position.

The inner member 3 of the main beam 11 of each module 4 has attached thereto at its forward end a mounting bracket 15 provided with a mounting plate 16 at each end thereof; the mounting plates 16 carrying therebetween a pivot pin 17 on which is mounted a pair of carrier arms 18 for a pair of spaced, movable bale-engageable tines or spikes 19. The arms 18 are interconnected by a beam 20. Each tine 19 curves downwardly from the corresponding carrier arm 18 an has a pointed end for ease of insertion into a bale to be picked up; such a bale being indicated in outline at 21 in FIGS. 1 and 2 of the drawings and a second and adjacent bale being indicated at 22 in FIG. 2 of the drawings. The tines 19 are releasably attached to the corresponding carrier 18 on each module 4 in order that they can readily be reversed for shipment and/or transport purposes. The tine carrier beam 20 of each module 4 has a mounting arm 23 attached thereto. Each one of these arms 23 receives an end of a pivot pin 24 to which is pivotally attached a flattened end of a telescopic rod 25; the other end of which is also flattened and is connected, via a pivot pin 26, to one end of a corresponding link 27. The other end of each one of these links 27 is pivotally attached at 28 to the corresponding main beam 11. The rods 25 and the links 27 provide, in effect, an extensible linkage system; the members of which are cooperable with corresponding locking members 31. Each one of these locking members 31 has a hooked end 3 which is releasably engageable with the pivotal coupling 26 between the corresponding rod 25 and link 27 to retain said rod 25 and link 27 in a retracted position. Each locking member 31 is rigidly connected to a link 33 which is pivotally mounted at 34 intermediate its ends to the corresponding main beam 11. The other end of each link 33 is provided with a slot 35 which is engageable by a pin 36 attached to one end of an arm 37 of a bell-crank lever; the other arm 38 of which is disposed in front of the main tranverse beam 1 of the base frame 10 and extends at an angle so as to incline forwardly of the apparatus relative to the normal direction of movement thereof in picking up bales. Each bell-crank lever 37, 38 is pivotable about a pivot 30 on the corresponding main beam 11 and in effect, forms a bale sensing means. Each locking member 31 and associated link 33 also form a bell-crank lever. A spring 39 acts between each locking member 31 and the pivot 28 of the corresponding link 27 so as to urge said locking member 31 in the locking direction, i.e. into engagement with the corresponding pivot 26.

Each rod 25 is telescopic so as to be adjustable to match the adjustment of the corresponding main beam 11, the inner and outer members of each said rod being apertured so that a pin, bolt or the like 49 can be inserted in aligned apertures to secure each said rod 25 in an adjusted position in a manner similar to the adjustment of the corresponding main beam 11. The extensible linkage system including the rod 25 and the link 27 on the one hand and the locking bell-crank members 31, 33 on the other hand form part of locking means for the movable tine means 19 and which are indicated in general in the drawings with reference numeral 29.

A double-acting hydraulic actuator 41 is provided on each bale grab module 4. The cylinder 42 of each actuator 41 is pivotally mounted between a pair of lugs 43 on a pivot pin 44; the lugs being mounted on the corresponding main beam 11. To accommodate different lengths of bales, several pairs of lugs 43 are provided along the length f the fixed part 12 of the telescopic main beam 11; the cylinder 42 being pivotally connectable to anyone of said pairs of lugs 43. The piston 45 of each hydraulic actuator 41 is connected to a rod 46 which itself in turn is pivotally coupled to the pivot pin 24 between a pair of mounting lugs 47 attached to the corresponding carrier member 18, between which lugs the pivot pin 24 extends. The hydraulic actuators 41 of all modules 4 employed in a given arrangement of the bale handling apparatus are connected hydraulically in parallel to a supply of pressure fluid via a control valve 48 which is shown in FIG. 3 of the drawings. The control valve 48 is of conventional type and in one control position, connects one end of the respective cylinders 42 of the actuators 41 to pressure fluid; and in the other control position, connects the opposite ends of the cylinders to pressure fluid, with an intermediate or neutral position of the valve 48 serving to pass pressure fluid to the tank.

In operation, the bale handling apparatus according to the present invention is first arranged as required by way of fitting the requisite number of bale grab modules 4 to the main transverse beam 1; the hinged mounting plates 6 serving to facilitate basic assembly of the modules on to the beam 1, as well as facilitating adjustment thereof along that beam, as already mentioned. The hydraulic connections to the respective ends of each cylinder 42 then are made, via releasable self-sealable couplings, to a manifold to which the control valve 48 is connected which itself normally is part of the standard hydraulic system of the tractor or other vehicle onto which the bale handling apparatus is mounted. Once the number of modules 4 has been selected for a given operation, the spacing thereof is then adjusted to suit the selected manner of handling the bales, i.e. by way of picking them up with either the 60 cm nominal face resting on the ground or with the 90 cm nominal face resting on the ground, in case bales of 60 cm by 90 cm are being handled.

The telescopic main beams 11 further also are adjusted according to the length of the bales to be handled. These beams 11 preferably are adjusted so that the curved tine 19 are positioned generally at two thirds of the length of the bales when the latter are held by the apparatus.

Having decided upon the basic format of the apparatus to be employed in a given bale handling operation, the apparatus is then mounted on the front end loader attachment arms of a tractor or other vehicle and the vehicle is driven towards a bale or set of bales to be picked up. For convenience of description, it will be assumed that bales are to be picked up singly. This is accomplished by first driving the tractor or other vehicle towards a selected bale, with the apparatus being held at a height such that the undersides of the main beams 11 of the bale grab modules 4 are positioned approximately at the same level as the top of the bale to be picked up; this height again depending on whether the bales are resting on their 60 cm face or 90 cm face. The operator then selects which of the four modules 4 (as regards the illustrated embodiment employing four modules) is to be used to pick up the first bale (it being immaterial which module is used); the selected module the being positioned generally centrally of that bale as the latter is approached by the apparatus. A bale approached in this manner first of all is engaged by the fixed tines or spikes 9 and then immediately thereafter engages the arm 38 of the selected module 4. This causes the bell-crank lever 38, 37 to be rotated anti-clockwise, as seen in FIG. 1 of the drawings, about the pivot 30. This, in turn, causes a pivoting of the locking member 31 in the clockwise direction about the pivot point 34. Thus, the hooked end 32 of the locking member 31 of the bale grab module in question disengages the pivotal coupling 26 between the corresponding rod 25 and link 2.. When the bale to be picked up is in position, the tractor or other vehicle operator operates the control valve 48 in order to supply pressure fluid to the hydraulic actuators 41 such as to extend the same.

However, it should be noted that, while all the actuators 41 of the modules 4 employed in a given arrangement of the apparatus are connected to receive pressure fluid by this action of the control valve 48, only the one actuator 41 associated with the module 4 selected to pick up the bale in question will extend because the associated rod 25 has been unlocked, whereas the rods 25 of the remaining modules 4 remain locked which thus prevent the associated actuators 41 from being extended. Extension of the actuator 41 of the selected module 4 pivots the pair of curved tines 19 anticlockwise as seen in FIG. 1 of the drawings. This movement is accommodated, as far as the associated rod 25 is concerned, by the link 27 providing an effective extension of that rod; the components 25 and 27 taking up the position shown in phantom in FIG. 1 of the drawings. Upon rotary movement of the tines 19 of the selected module 4, the pointed ends thereof are inserted into the top surface of the bale and thus the bale is now securely gripped between the tines 9 and 19 such that, if the front end loader attachment is now lifted, the engaged bale is also lifted along with the basic apparatus. The tractor or other vehicle can now be driven to a second bale whereafter the same operation is repeated; the operator again selecting the next module 4 for receiving the second bale. This is repeated until the apparatus has picked up a full complement of bales or a reduced number, according to circumstances. It should be noted that once a bale has been picked up, the control valve 48 is deactuated and then actuated again when the next bale is to be picked up, an so on.

It will be appreciated that, if there are four bale grab modules 4 provided in a given arrangement o the bale handling apparatus, then it also is possible to pick up two, three or four bales simultaneously, provided that they are generally located together. In this regard, the bales do not have to be tightly packed adjacent one another because, any bale which is generally spaced apart from the other bales in a transverse direction, can be regularized by the use of a beam (not shown) on the apparatus. Said beam can be brought into engagement with an end bale whereafter the tractor or other vehicle then can be turned in the appropriate direction generally to move all bales into close contact with each other. It will be appreciated that any displacement of a bale from a general stack in the longitudinal direction also will be corrected as the apparatus is driven into the stack of bales.

In order to discharge bale from the apparatus, the control valve 48 is actuated in the opposite sense so as to pressurize the other ends of the actuators 41 so as to contract the same. This results in the tines 19 being withdrawn from the bales and in an attendant movement of the rods 25 to the original and full line positions of FIG. 1. The bales, at this stage, are still engaged by the fixed tines 9 and all that is necessary in order to effect final discharge of the bales is for the tractor or other vehicle to back off from the stack so as to retract the tines 9 from the bales. As soon as the bales have been released from the fixed tines 9, the arms 38 of the bell-crank levers 37, 38 are released whereafter the springs 39 operate to pull the locking members 31 back into locking engagement with the pivot pins 26 and thus also move the bell-crank lever arms 38 back to their original positions, ready for engagement by further bales to be picked up.

It should be noted that the vertical displacement between the pivot axes 26 and 28 of each link 27 is relatively small. This is a feature of the design whereby, when the locking member 31 of a given module 4 is still engaged with the associated pivot 26 and when a given actuator 41 is pressurized such as to tend to extend the same, the force exerted via the rod 25 upon the link 27, in the sense to pivot said link 27 in the anticlockwise direction as seen in FIG. 1, is relatively small, whereby the force required to release the locking member 31 is also relatively small and thus readily accomplished by the engagement of a bale with the arm 38.

FIGS. 1 and 2 of the drawings illustrate bales being picked up with their shorter size (e.g. 60 cm) resting on the ground. However, it is also possible for bales to be picked up with their longer sides (e.g. 90 cm) resting on the ground although, therefore, some transverse adjustment of the bale grab modules 4 is then desirable. Basically, the two central modules 4 should be moved close together, with the two outer modules being positioned accordingly so as to accommodate three bales on their longer sides. If the apparatus is to be used with bales which are shorter or longer than those previously handled, then the main beam 11 of each module 4 needs to be retracted, or respectively extended, together with appropriate corresponding adjustment of the rod 25 in the manner described above.

It will be seen that the present invention provides a bale handling apparatus of extremely simple construction and yet possessing a versatility which enables the apparatus readily to be adjusted to handle a selected number of bales and also bales in the one or other orientation without difficulty. This facility is afforded by the provision of identical bale grab modules which can be brought into use and/or adjusted, extremely simply.

It will also be seen that the apparatus according to the present invention advantageously may be used for grouping randomly positioned bales in groups of 2, 3, 4 or even more bales. Similarly, the apparatus further also is very practical for grouping and stacking bales in stacks comprising a plural number of layers of bales with each layer comprising, e.g, 3 or 4 bales and with adjacent layers being turned 90° with respect to each other so as to form particularly stable stacks.

Furthermore, the apparatus according to the invention can be operated with the standard hydraulics of an agricultural tractor and is very simple in use because only one hydraulic valve has to be actuated for operating any one of the bale grab modules; the arrangement being such that the hydraulic system of said any one module is triggered by a bale positioned to be picked up by said module.

What is claimed is:
1. Bale handling apparatus comprising:
a main frame including transverse support means;
means mounted on the main frame for picking up bales;
the bale pick-up means including a plurality of substantially identical modules which are transversely adjustably mounted on the transverse support means of the main frame so that the number and position of the modules can be varied;
each bale pick-up module having a main beam which, when said module is attached to the main frame, extends generally perpendicularly to the transverse support means of said main frame, and each said module also having fixed and movable tine means for engaging a bale;

said transverse support means of the main frame including a first transverse beam and a second transverse beam spaced below the first beam, each module being provided with mounting means which is releasably attachable to the first beam and which further is co-operable with the second beam to support said module in position; and said mounting means for each module being in the form of generally upright cranked means which is fixedly coupled adjacent the upper end thereof to the rear end of the main beam of said module and which has a lower end, when said module is mounted on the main frame, in abutting engagement with the second transverse beam of said main frame, and said cranked means also carrying adjacent the lower end thereof said fixed tine means.

2. Bale handling apparatus according to claim 1, wherein each bale pick-up module is releasably attachable to the first transverse beam of the main frame by a pair of spaced apart mounting members provided on the module and engageable with opposed surface areas of said first transverse beam, said mounting members being clampable together so as releasably to secure the module in a selected position on said first transverse beam.

3. Bale handling apparatus according to claim 2, wherein the mounting members comprise a pair of spaced-apart plates, one of which is fixedly secured to the main beam of the module and the other one of which is hingedly connected to the module to facilitate assembly and adjustment of the module with respect to the first transverse beam of the main frame.

4. Bale handling apparatus according to claim 3, wherein the movable tine means of each pick-up module are provided at the forward end of the main beam of said module for pivotal movement between an operative position in which said tine mans engage a bale to assist in supporting the same and an inoperative position in which said tine means are retracted clear of a bale.

5. Bale handling apparatus according to claim 4, wherein:

actuator means are operatively connected between the movable tine means and the main beam of each bale pick-up module to move said movable tine means to and from the operative position, the actuator means of the respective bale pick-up modules are connectable in parallel to common drive means, and releasable locking means are associated with the movable tine means of each bale pick-up module for locking said movable tine means in the inoperative position so that only those movable tine means which are unlocked against movement to the operative position, and have not already achieved the latter position, will be moved to said operative position when the common drive means is operated to energize the actuator means in the sense for moving the movable tine means to the operative position.

6. Bale handling apparatus according to claim 5, wherein the actuator means nd common drive means are of the hydraulic type.

7. Bale handling apparatus according to claim 6, wherein each bale pick-up module is provided with bale sensing means associated with the locking means of each said module in a manner such that the locking means are moved to the unlocking position when the bale sensing means sense a bale which is properly positioned relative to said bale pick-up module and is ready to be picked up thereby.

8. Bale handling apparatus according to claim 7, wherein the bale sensing means of each bale pick-up module comprises a bell-crank lever which is operably connected to the corresponding locking means of said module and which includes an arm which, in use, is engaged and moved by a bale properly positioned relative to said bale pick-up module and ready to be picked up thereby.

9. Bale handling apparatus according to claim 8, wherein the releasable locking means of each bale pick-up module comprises:

a linkage system coupled to the movable tine means of said module for movement in unison therewith; and a locking member releasably co-operable with said linkage system to allow or prevent, as appropriate, movement of that system and as a consequence, also of the movable tine means to which said system is coupled.

10. Bale handling apparatus according to claim 9, wherein the linkage system of each bale pick-up module comprises a rod operatively associated at one end with the corresponding movable tine means and pivotally connected at the other end to one end of a link the other end of which is pivotally mounted on the main beam of said bale pick-up module; the rod and the link providing an extensible member which is held in a retracted position by the corresponding locking member when the latter is in the locking position to prevent movement of said movable tine means to the operative position from the inoperative position and which is permitted to move to the extended position by the movement of said movable tine means from the inoperative position to the operative position when said locking member is in the unlocking position.

11. Bale handling apparatus according to claim 10, wherein the locking member of each bale pick-up module is provided with a hooked end which is cooperable with the corresponding linkage system to effect a locking of the corresponding movable tine means in the inoperative position and which forms part of a bell-crank lever which is pivotally mounted on the main beam of said module and which is operatively coupled to the corresponding bale sensing means for being moved thereby to the unlocking position when the bale sensing means senses a bale; the releasable locking means further also comprising resilient means acting between said main beam and said locking bell-crank lever to urge the hooked end of the locking member thereof to the locking position.

12. Bale handling apparatus according to claim 11, wherein:

the main beam of each bale pick-up module is telescopingly adjustable; and the movable tine means of said bale pick-up module are provided generally at or adjacent the free end of the telescopic part of said main beam to accommodate varying lengths of bales to be handled by the apparatus.

13. Bale handling apparatus according to claim 12, wherein the actuator means of each bale pick-up module extends between the movable tine means and the fixed part of the telescopic main beam of said module;

said actuator means being connectable to said fixed part of the telescopic main beam at a number of positions along the length thereof in order to accommodate differing lengths of bales to be handled by the apparatus.

14. Bale handling apparatus according to claim 13, wherein the rod of the linkage system of the locking means is telescopic in order that the length thereof can be adjusted to accommodate varying lengths of bales to be handled by the apparatus.

15. Bale handling apparatus according to claim 11, wherein:
the two pivot points of the link forming part of the linkage system are displaced from one another by a relatively small distance when said linkage system is in the retracted position and as seen in the generally perpendicular direction relative to the orientation of the rod of said system; and
the hooked end of the locking member is cooperable with a locking pin forming part of the linkage system so as to prevent, when positioned in its locking position, an increase of said distance between said pivot points of said link in said direction and said hooked end is movable between its locking and unlocking positions in a direction generally perpendicular to the direction of movement of the locking pin when the linkage system is moved away from its retracted position so that the force on the hooked end of the locking member created by an attempted actuation of the associated actuator means is minimized whereby the force required to move the locking member to the unlocking position is also minimized.

16. Bale handling apparatus according to claim 15, wherein the movable tine means of each bale pick-up module are removably mounted on a carrier which itself is pivotally mounted on the forward end of the corresponding main beam whereby the tine means can be reversed on that carrier for shipping and transport purposes.

17. Bale handling apparatus according to claim 16, wherein the actuator means are in the form of double-acting hydraulic actuators connected in parallel to a source of pressure fluid via a control valve which, in one position directs pressure fluid to extend the actuators, in another position directs pressure fluid to retract the actuators and in still another position bypasses the pressure fluid to a tank.

18. Bale handling apparatus comprising:
a generally transversely extending main frame;
a plurality of independent bale pick-up devices mounted on the main frame and each having movable tine means which, in an operative position, engage a bale and, in an inoperative position, are retracted clear of a bale;
actuator means associated with each respective bale pick-up device and operable to move the movable tine means thereof to and from the operative position, the actuator means of the respective bale pick-up devices being connectable in parallel to common drive means;
releasable locking means associated with the movable tine means of each bale pick-up device for locking said movable tine means in the inoperative position so that only those movable tine means which are unlocked against movement to the operative position, and have not already achieved the latter position, will be moved to said operative position when the common drive means is operated to energize the actuator means in the sense for moving the movable tine means to the operative position;
each bale pick-up device having a main beam extending generally perpendicularly to the generally transverse main frame and which operatively supports the corresponding movable tine means generally adjacent its forward end;
each bale pick-up device being provided with bale sensing means, each said bale sensing means of each pick-up device being associated with the locking means of each said pick-up device in a manner such that the locking means are moved to the unlocking position when the bale sensing means sense a bale which is properly positioned relative to said bale pick-up device and is ready to be picked up thereby;
said bale sensing means of each bale pick-up device including a bell-crank lever which is operably connected to the corresponding locking means of said pick-up device and an arm which, in use, is engaged and moved by a bale properly positioned relative to said bale pick-up device and ready to be picked up thereby;
said releasable locking means of each bale pick-up device including a linkage system coupled to the movable tine means of said pick-up device for movement in unison therewith, and a locking member releasably co-operable with said linkage system to allow or prevent, as appropriate, movement of that system and as a consequence, also of the movable tine means to which said system is coupled; and
said linkage system of each bale pick-up device including a rod operatively associated at one end with the corresponding movable tine means and pivotally connected at the other end to one end of a link, the other end of said link being pivotally mounted on the main beam of said bale pick-up device, the rod and the link providing an extensible member which is held in a retracted position by the corresponding locking member when the latter is in the locking position to prevent movement of said movable tine means to the operative position from the inoperative position and which is permitted to move to the extended position by the movement of said movable tine means from the inoperative position to the operative position when said locking member is in the unlocking position.

19. Bale handling apparatus according to claim 18, wherein the actuator means and common drive means are of the hydraulic type.

20. Bale handling apparatus according to claim 18, wherein the locking member of each bale pick-up device is provided with a hooked end which is cooperable with the corresponding linkage system to effect a locking of the corresponding movable tine means in the inoperative position and which forms part of a bell-crank lever which is pivotally mounted on the main beam of said pick-up device and which is operatively coupled to the corresponding bale sensing means for being moved thereby to the unlocking position when the bale sensing means senses a bale; the releasable locking means further also comprising resilient means acting between said main beam and said locking bell-crank lever to urge the hooked end of the locking member thereof to the locking position.

21. Bale handling apparatus according to claim 20, wherein:

the main beam of each bale pick-up device is telescopingly adjustable, and the movable tine means of said bale pick-up device are provided generally adjacent the free end of the telecopic part of said main beam to accommodate varying lengths of bales to be handled by the apparatus.

22. Bale handling apparatus according to claim 21, wherein the actuator means of each bale pick-up device extend between the movable tine means and the fixed part of the telescopic main beam of said pick-up device; said actuator means being connectable to said fixed part of the telescopic main beam at a number of positions along the length thereof in order to accommodate differing lengths of bales to be handled by the apparatus.

23. Bale handling apparatus according to claim 22, wherein the rod of the linkage system of the locking means is telescopic in order that the length thereof can be adjusted to accommodate varying lengths of bales to be handled by the apparatus.

24. Bale handling apparatus according to claim 23 wherein:

the two pivot points of the link forming part of the linkage system are displaced from one another by a relatively small distance when said linkage system is in the retracted position and as seen in the generally perpendicular direction relative to the orientation of the rod of said system ; and the hooked end of the locking member is cooperable with a locking pin forming part of the linkage system so as to prevent, when positioned in its locking position, an increase of said distance between said pivot points of said link in said direction and said hooked end is movable between its locking and unlocking positions in a direction generally perpendicular to the direction of movement of the locking pin when the linkage system is moved away from its retracted position so that the force on the hooked end of the locking member created by an attempted actuation of the associated actuator means is minimized whereby the force required to move the locking member to the unlocking position is also minimized.

25. Bale handling apparatus according to claim 24, wherein the movable tine means of each bale pick-up device are removably mounted on a carrier which itself is pivotally mounted on the forward end of the corresponding main beam whereby the tine means can be reversed on that carrier for shipping and transport purposes.

26. Bale handling apparatus according to claim 25, wherein the actuator means are in the form of double-acting hydraulic actuators connected in parallel to a source of pressure fluid via a control valve which, in one position directs pressure fluid to extend the actuators, in another position directs pressure fluid to retract the actuators and in still another position bypasses the pressure fluid to a tank.

* * * * *